United States Patent
Yu et al.

(10) Patent No.: US 9,563,230 B2
(45) Date of Patent: Feb. 7, 2017

(54) DISPLAY ASSEMBLY

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Zhan-Ao Yu, Shenzhen (CN); Quan Liao, Shenzhen (CN); Te-Hsu Wang, New Taipei (TW); Chih-Kang Cho, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 78 days.

(21) Appl. No.: 14/548,497

(22) Filed: Nov. 20, 2014

(65) Prior Publication Data

US 2015/0146358 A1    May 28, 2015

(30) Foreign Application Priority Data

Nov. 22, 2013    (CN) .......................... 2013 1 0592889

(51) Int. Cl.
*G06F 1/16* (2006.01)

(52) U.S. Cl.
CPC .............. *G06F 1/1601* (2013.01); *G06F 1/16* (2013.01)

(58) Field of Classification Search
CPC .... G06F 1/1601; G06F 1/1613; G06F 1/1622; G06F 1/1643; G06F 1/1637; G06F 1/16; H05K 5/03; H05K 5/04; H05K 7/14; F16M 11/10; F16M 11/24; F16M 2200/08

USPC ........................ 361/679.01, 679.02, 679.21, 679.22,361/679.26, 679.27; 349/58–60; 248/917–924

See application file for complete search history.

(56) References Cited

U.S. PATENT DOCUMENTS

| | | | |
|---|---|---|---|
| 2009/0180247 A1* | 7/2009 | Park .......................... | H05K 5/02 361/679.21 |
| 2013/0271697 A1* | 10/2013 | DeForest .......... | G02F 1/133305 349/60 |

FOREIGN PATENT DOCUMENTS

| | | |
|---|---|---|
| CN | 201527518 U | 7/2010 |
| TW | M253812 U | 12/2004 |
| TW | M1463379 U | 10/2013 |

* cited by examiner

*Primary Examiner* — Anthony Haughton
*Assistant Examiner* — Ingrid Wright
(74) *Attorney, Agent, or Firm* — Zhigang Ma

(57) ABSTRACT

A display assembly includes a front frame with an opening, a display panel, and a back frame. The display panel is mounted between the front frame and the back frame. The front frame includes a front frame body and a side frame portion surrounding the front frame body. A groove is defined in the side frame portion. The back frame includes a receiving portion and a mounting portion. The mounting portion includes an outer frame body surrounding the receiving portion and one or more flanges protruding from the outer frame body. The receiving portion defines a receiving section for receiving the display panel. The back frame includes one or more resisting blocks protruding from the receiving section. The resisting blocks resist the display panel. The flanges engage in the groove to secure the front frame to the back frame.

14 Claims, 10 Drawing Sheets

DISPLAY ASSEMBLY

CROSS-REFERENCE TO RELATED APPLICATIONS

This application claims priority to Chinese Patent Application No. 201310592889.2 filed on Oct. 22, 2013 in the China Intellectual Property Office, the contents of which are incorporated by reference herein.

FIELD

The subject matter herein generally relates to a display assembly in a computer.

BACKGROUND

In a computer, a display assembly is used to support the display.

BRIEF DESCRIPTION OF THE DRAWINGS

Implementations of the present technology will now be described, by way of example only, with reference to the attached figures.

DETAILED DESCRIPTION

Figure 1:
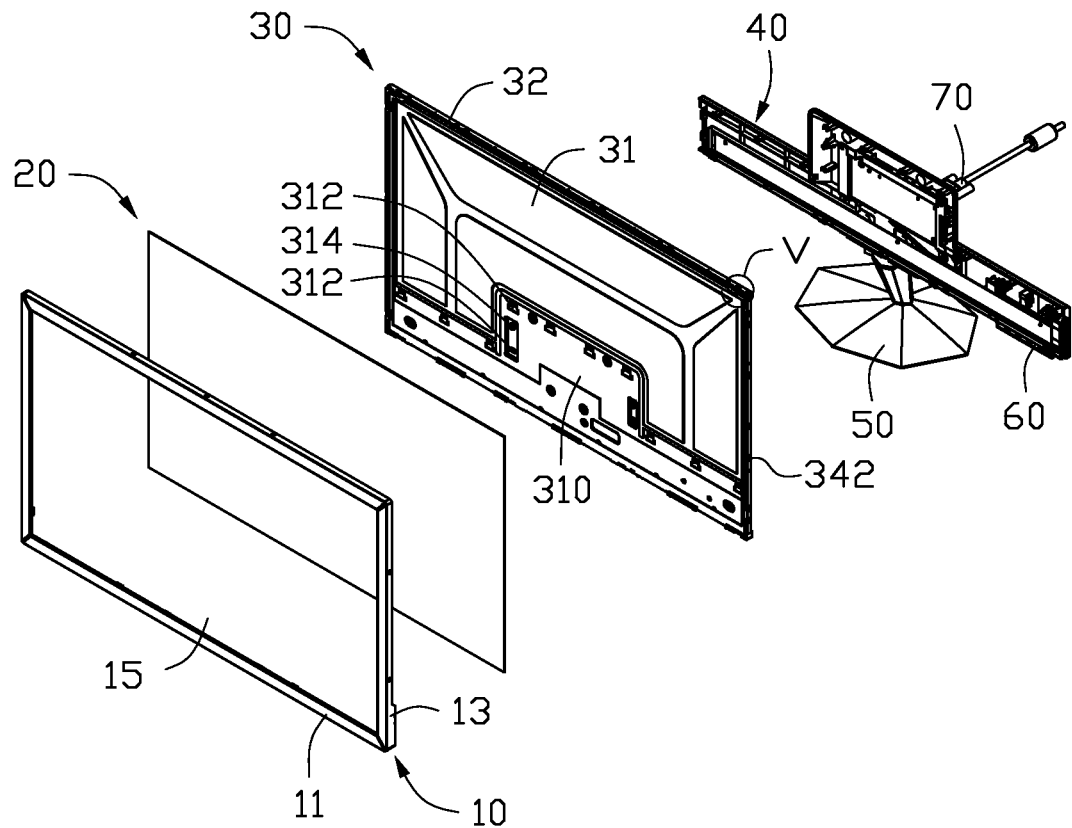
FIG. 1 is an exploded, isometric view of an embodiment of a display assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "inside" indicates that at least a portion of a region is partially contained within a boundary formed by the object. The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "comprising, but not necessarily limited to"; it specifically indicates open-ended inclusion or membership in the so-described combination, group, series and the like.

The present disclosure is in relation to a display assembly in a computer.

FIG. 1 illustrates an embodiment of a display assembly. The display assembly comprises a front frame 10, a display panel 20, a back frame 30, a back enclosure 40, and a base 50. The display panel 20 has a first side and a display side opposite to and substantially parallel to the first side.

Figure 2:
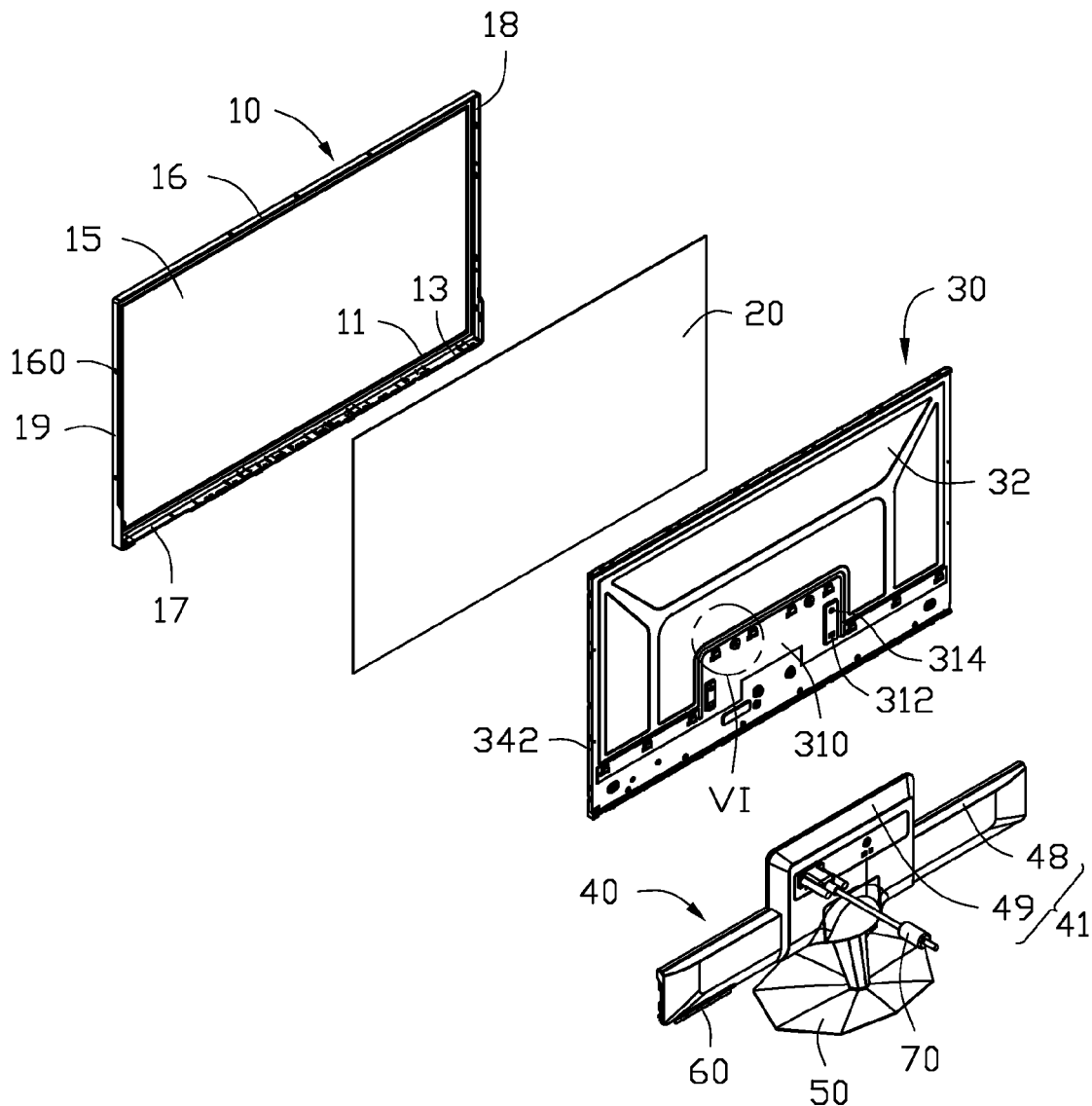
FIG. 2 is similar to FIG. 1, but viewed from a different angle.
Figure 3:
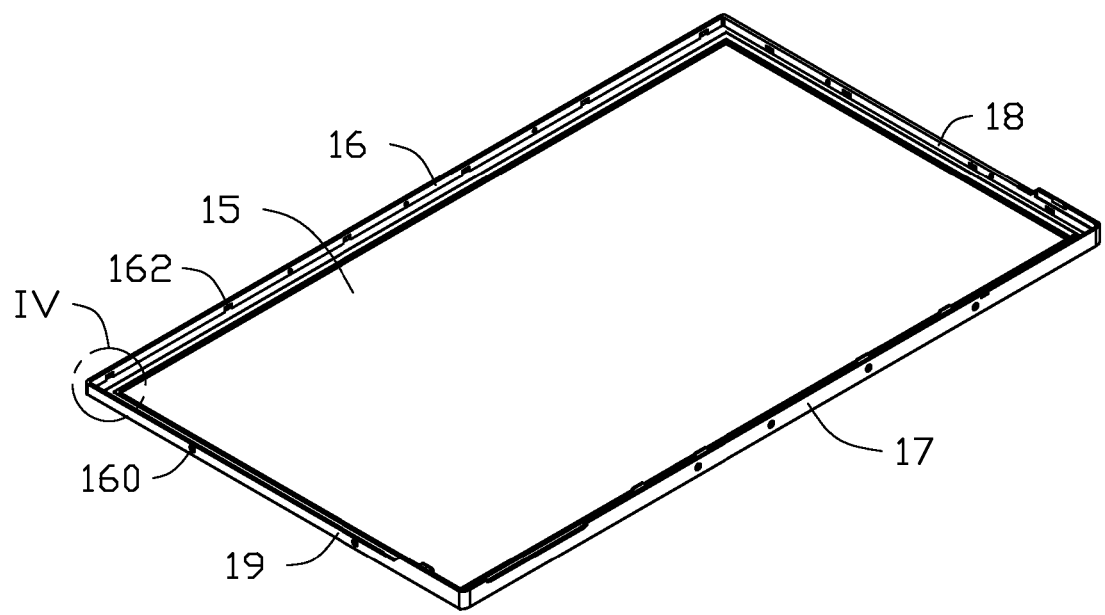
FIG. 3 is an isometric view of a front frame of the display assembly of FIG. 1.
Figure 4:
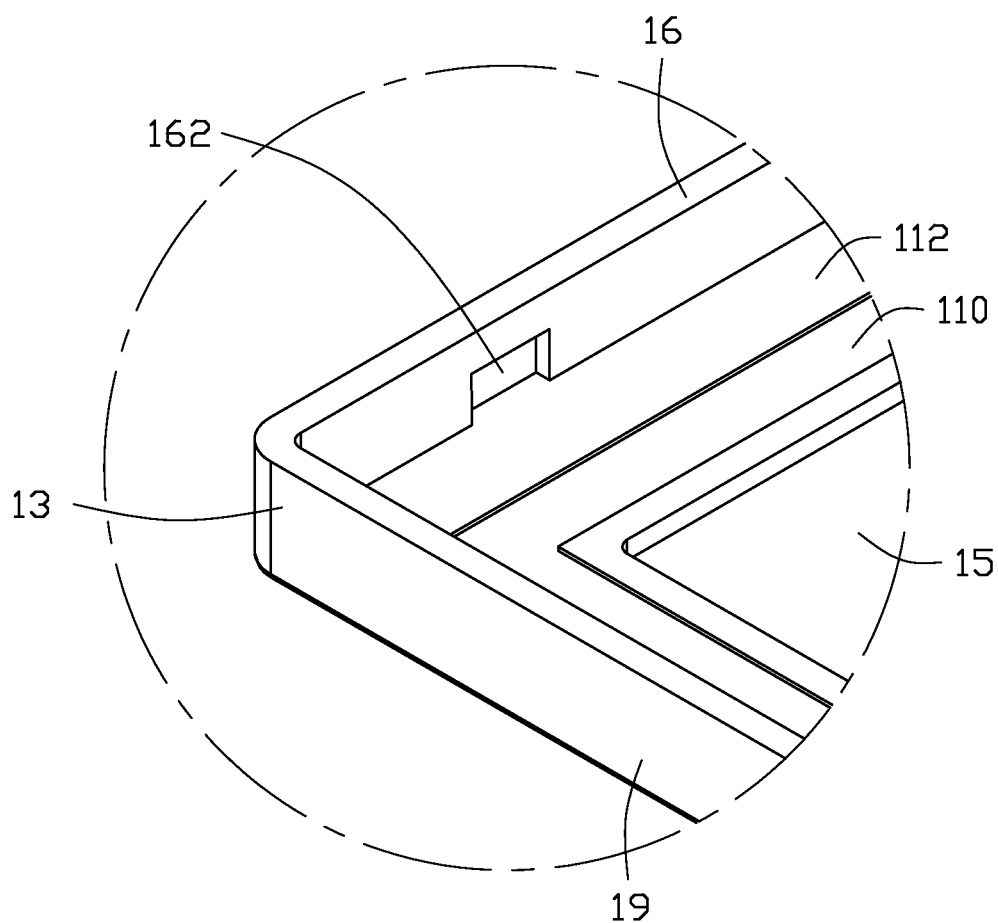
FIG. 4 is an enlarged view of a circled portion IV of FIG. 3.
Figure 5:
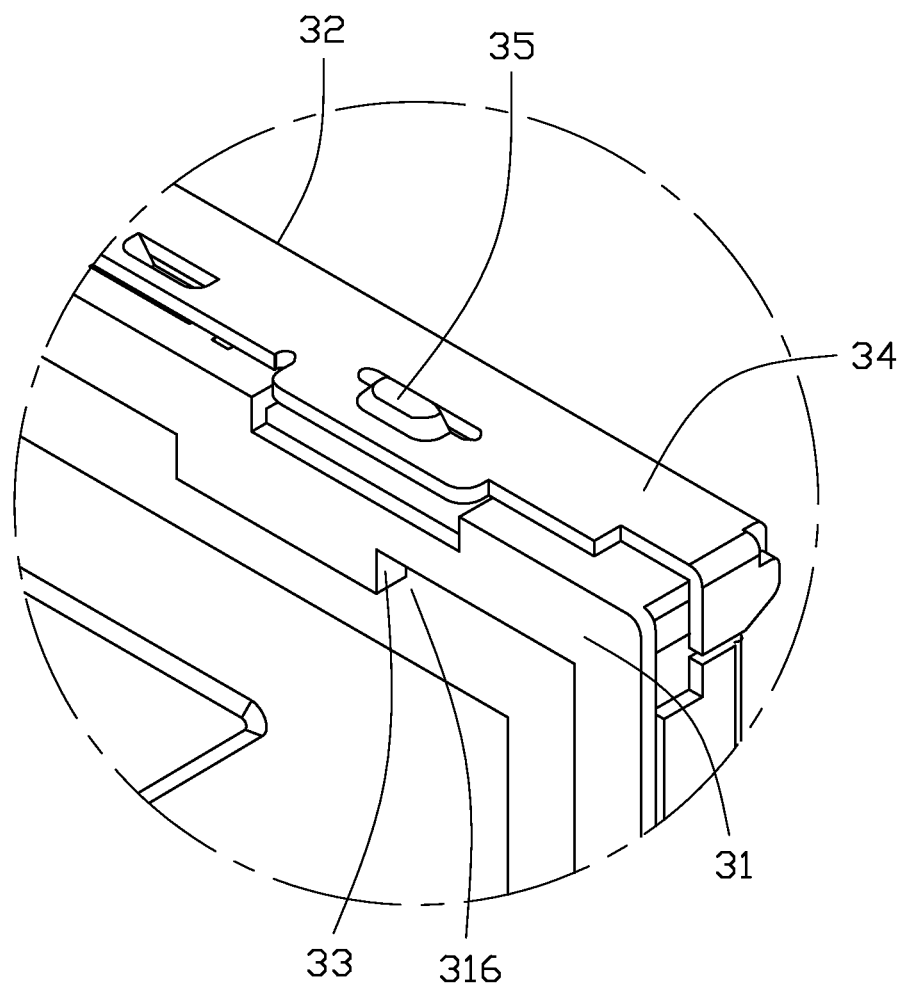
FIG. 5 is an enlarged view of a circled portion V of FIG. 1.
Figure 6:
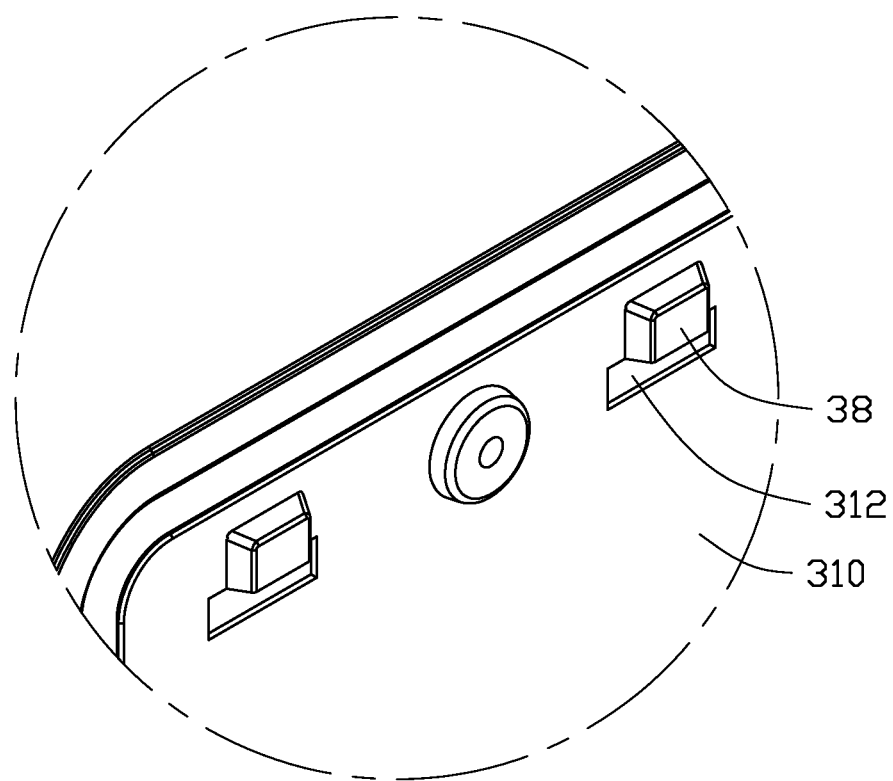
FIG. 6 is an enlarged view of a circled portion VI of FIG. 2.

FIGS. 2-4 illustrate that the front frame 10 comprises a front frame body 11 and a side frame portion 13 surrounding the front frame body 11 and extending inward from the front frame body 11. The front frame 10 defines an opening 15 extending through the front frame body 11 and the side frame portion 13. The side frame portion 13 comprises a first bent edge 16, a second bent edge 17 corresponding to the first bent edge 16 and substantially parallel to the first bent edge 16, a left bent edge 18 is coupled to the first bent edge 16 and the second bent edge 17, and a right bent edge 19. The first bent edge 16, the second bent edge 17, the left bent edge 18, and the right bent edge 19 define a plurality of grooves 162. A mounting section 110 corresponding to the display panel 20 and a securing section 112 surrounding the mounting section 110 are defined in the inside of the front frame body 11. The mounting section 110 surrounds the opening 15.

FIGS. 1-2 and 5-6 illustrate that the back frame 30 comprises a receiving portion 31 for receiving the display panel 20 and a mounting portion 32 surrounding the receiving portion 31. A plurality of resisting blocks 33 protrude from the inside of the receiving portion 31. The mounting portion 32 comprises an outer frame body 34 surrounding the receiving portion 31 and a plurality of flanges 35 extending outward from the outer frame body 34. A plurality of protrusions 38 protrude outward from a back side of the receiving portion 31. The receiving portion 31 comprises a securing portion 310. The resisting blocks 33, the flanges 35, and the protrusions 38 are located in the securing portion 310. The securing portion 310 is substantially inverted T-shaped. The securing portion 310 defines a plurality of engaging holes 312 and two inserting holes 314. The resisting blocks 33 protrude from the corresponding edges of the flanges 35. A plurality of fastening holes 342 are defined in the corresponding outer edges of the outer frame body 34.

Figure 7:
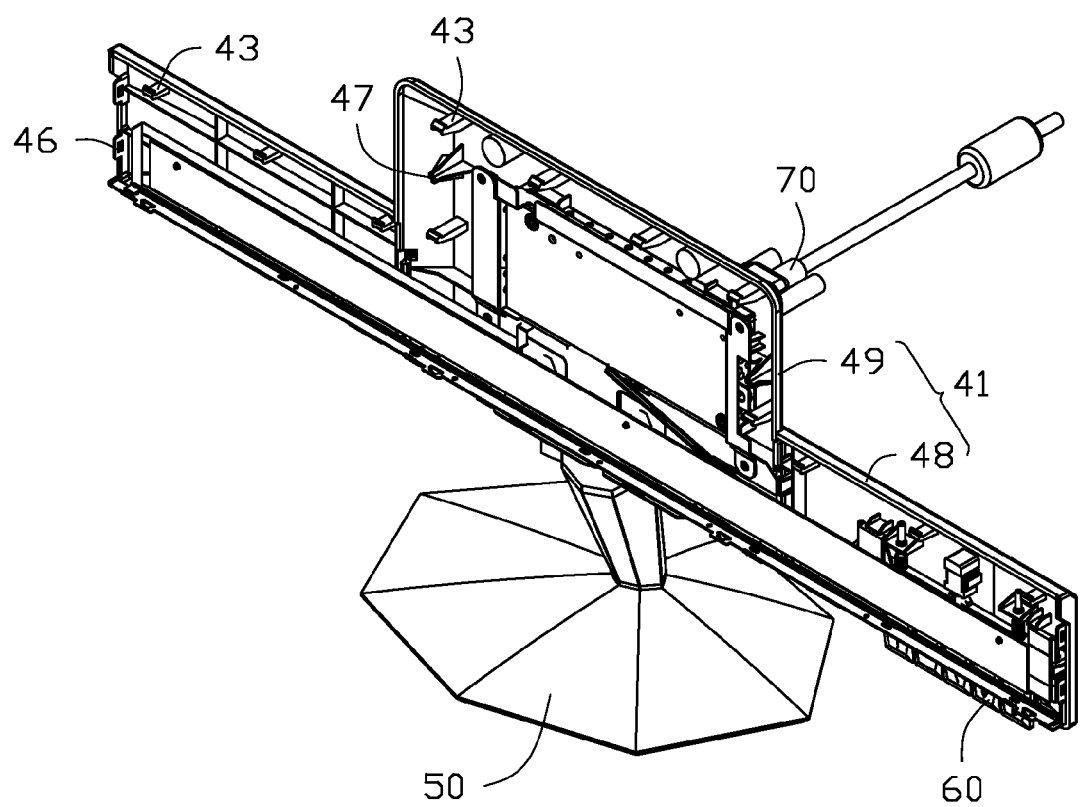
FIG. 7 is an isometric view of a back enclosure and a base of the display assembly.
Figure 8:
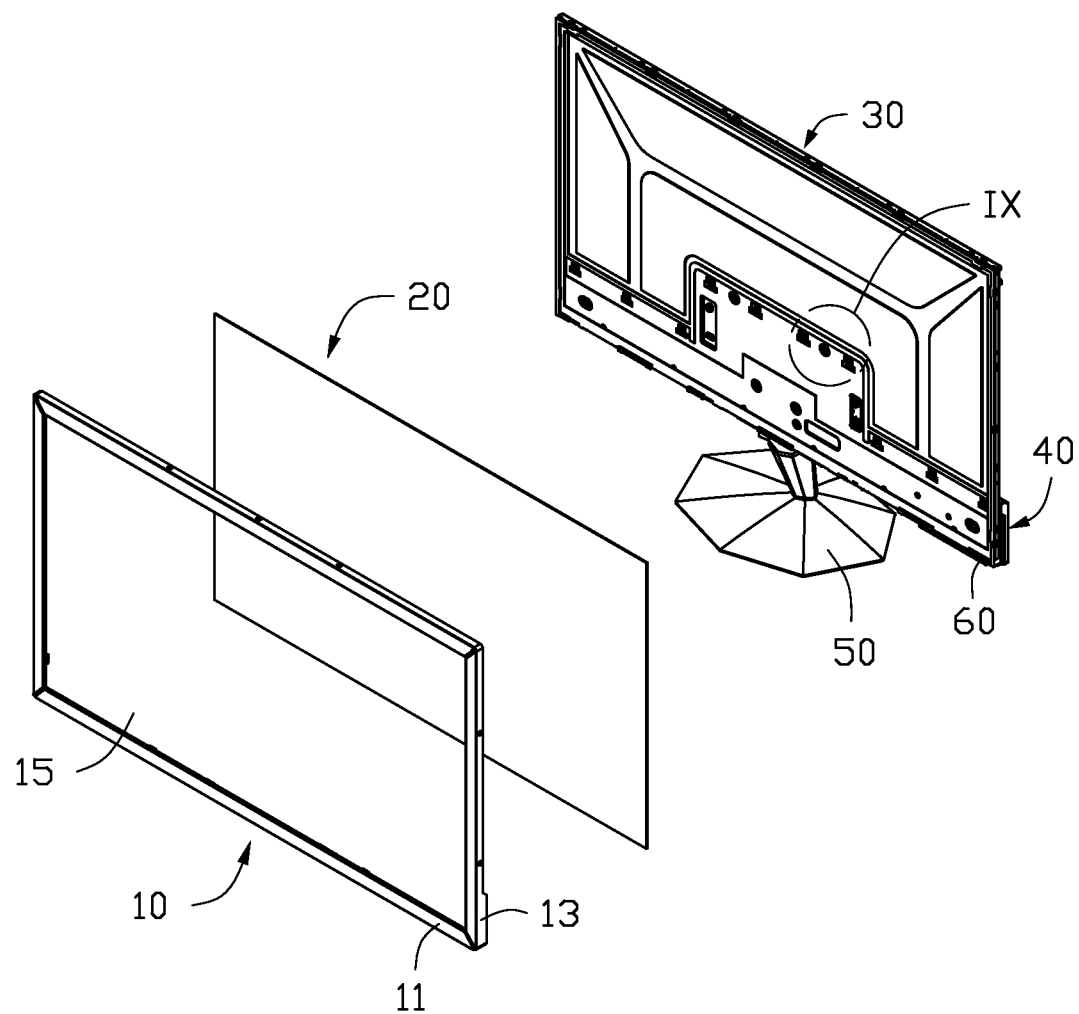
FIG. 8 is another an exploded, isometric view of the display assembly, but the back enclosure is mounted to a back frame.
Figure 9:
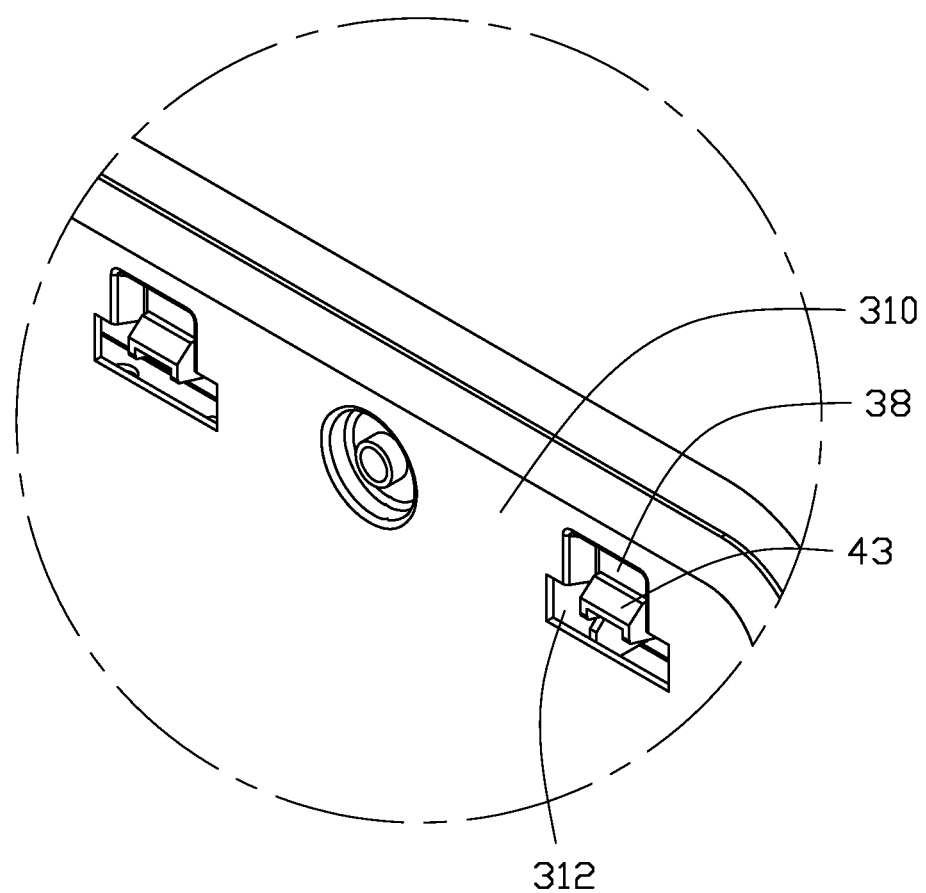
FIG. 9 is an enlarged view of a circled portion IX of FIG. 8.
Figure 10:
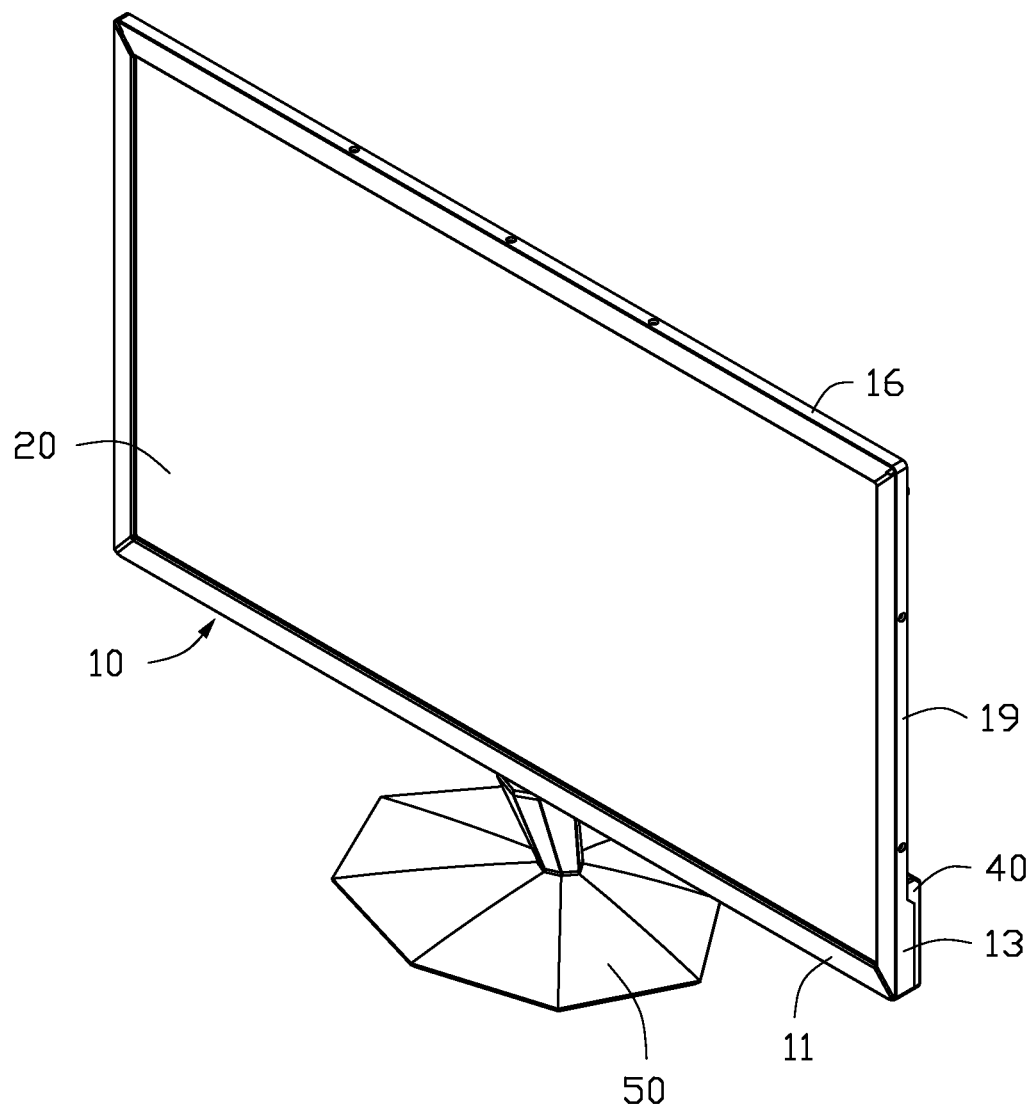
FIG. 10 is an assembled, isometric view of the display assembly of FIG. 1.

FIG. 7 illustrates that the back enclosure 40 comprises an inverted T-shaped back enclosure body 41, a plurality of hooks 43, a plurality of engaging tabs 46, and two inserting bodies 47. An area of the cross section of the back enclosure body 41 is less than an area of the cross section of the back frame 30. The back enclosure body 41 comprises a square plate body 48 and a square mounting plate 49 extending substantially perpendicular from the central portion of the plate body 48. One end of the plate body 48 is mounted to an operation keyboard 60. The mounting plate 49 is configured to mount a cable 70. The engaging tabs 46 protrude from two sides of the plate body 48. The hooks 43 protrude from four side edges of the plate body 48 and the mounting plate 49. The inserting bodies 47 protrude from the mounting plate 49. Each inserting body 47 is between two corresponding hooks 43.

FIGS. 4 and 8-10 illustrate when in assembly, the back enclosure 40 and the base 50 are moved. The hooks 43 are aligned with the corresponding engaging holes 312. The inserting bodies 47 are inserted into the corresponding inserting holes 314. The hooks 43 are engaged with the corresponding engaging holes 312. The protrusions 38 limit the hooks 43 from disengaging from the corresponding engaging holes 312. The back enclosure 40 is mounted a back side of the back frame 30. The display panel 20 is placed in the receiving section 316 (shown in FIG. 5). The resisting blocks 33 support the first side of the display panel 20. The grooves 162 are aligned with the corresponding flanges 35 (shown in FIG. 5) and the corresponding engaging tabs 46. The front frame 10 is moved. The grooves 162 are engaged with the corresponding flanges 35 (shown in FIG. 5) and the corresponding engaging tabs 46, respectively. The display panel 20 is located in the mounting section 110 and is received in the opening 15. The display side of the display panel 20 is positioned within the opening 15. The back frame 30 is located in the securing section 112. The securing holes 160 are fastened to the corresponding fastening holes 342 by fasteners (not shown).

It is to be understood that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A display assembly in a computer comprising:
    a display panel with a first side and a display side opposite to and substantially parallel to the first side;
    a front frame defining an opening and having a side frame portion;
    a back frame received within the side frame portion, the back frame having a receiving portion and a mounting portion surrounding the receiving portion, an inverted T-shaped securing portion is defined in a bottom portion of the receiving portion; and
    a back enclosure mounted to the mounting portion and located on a back side of the back frame, wherein the back enclosure is mounted to the side frame portion to enable the back frame to be between the front frame and the back enclosure;
        wherein, the display panel is mounted between the front frame and the back frame with the display side of the display panel positioned within the opening of the front frame;
        wherein, the receiving portion of the back frame comprises a receiving section for receiving the display panel and one or more resisting blocks protruding from the receiving section to support the first side of the display panel;
        wherein, a groove is defined in the side frame portion and positioned toward the opening defined by the side frame portion; and
        wherein, the securing portion has one or more flanges engagable with the groove securing the front frame to the back frame.

2. The display assembly of claim 1, wherein the back enclosure comprises a hook and the receiving portion defines an engaging hole engaged with the hook.

3. The display assembly of claim 1, wherein the back enclosure further comprises a plate body and a mounting plate extending from the central portion of the plate body, and the mounting plate is configured to mount a cable.

4. The display assembly of claim 3, wherein the back enclosure further comprises a back enclosure body with the plate body and the mounting plate, the plate body is substantially perpendicular to the mounting plate, thus the back enclosure body is substantially inverted T-shaped.

5. The display assembly of claim 3, wherein the receiving portion defines an inserting hole, the back enclosure comprises an inserting body defined in the mounting plate and inserted in the inserting hole.

6. The display assembly of claim 1, wherein a mounting section for the display panel is defined in the inside of the front frame body and surrounds the opening.

7. The display assembly of claim 6, wherein a securing section mounted to the mounting portion and defined in the inside of the front frame body surrounds the mounting section.

8. A display assembly comprising:
    a display panel with a first side and a display side opposite to and substantially parallel to the first side;
    a front frame defining an opening and having a front frame body portion and a side frame portion surrounding the front frame body portion;
    a back frame received within the side frame portion, the back frame having a receiving portion and a mounting portion, the mounting portion comprising an outer frame body surrounding the receiving portion, an inverted T-shaped securing portion is defined in a bottom portion of the receiving portion; and
    a back enclosure mounted to the mounting portion and located on a back side of the back frame, wherein the back enclosure is mounted to the side frame portion to enable the back frame to be between the front frame and the back enclosure
        wherein, the display panel is mounted between the front frame and the back frame with the display side of the display panel positioned within the opening of the front frame;
        wherein, the receiving portion of the back frame comprises a receiving section for receiving the display panel and one or more resisting blocks protruding from the receiving section to support the first side of the display panel;
        wherein, a first groove is defined in the side frame portion and positioned toward the opening defined by the side frame portion; and
        wherein, the securing portion has one or more flanges engagable with the groove securing the front frame to the back frame;
        wherein the side frame portion defines a plurality of securing holes, the outer frame body defines a plurality of fastening holes, and the securing holes are secured to the fastening holes to secure the front frame to the back frame.

9. The display assembly of claim 8, wherein the back enclosure comprises a hook and the receiving portion defines an engaging hole engaged with the hook.

10. The display assembly of claim 8, wherein the back enclosure comprises an engaging tab and a second groove defined in the inside of the side frame portion and engaged with the engaging tab.

11. The display assembly of claim 10, wherein the back enclosure further comprises a plate body and a mounting plate extending from the central portion of the plate body, the engaging tab is defined in the plate body, and the mounting plate is configured to mount a cable.

12. The display assembly of claim 11, wherein the back enclosure further comprises a back enclosure body with the plate body and the mounting plate, the plate body is substantially perpendicular to the mounting plate, thus the back enclosure body is substantially inverted T-shaped.

13. The display assembly of claim 11, wherein the receiving portion defines an inserting hole, the back enclosure comprises an inserting body defined in the mounting plate and inserted in the inserting hole.

14. The display assembly of claim 8, wherein a mounting section for the display panel and a securing section mounted to the mounting portion are defined in the inside of the front frame body, the securing section surrounds the mounting section and the mounting section surrounds the opening.

* * * * *